(12) United States Patent
Salani et al.

(10) Patent No.: US 6,481,773 B1
(45) Date of Patent: Nov. 19, 2002

(54) REMOVABLE STORAGE UNIT FOR A MOTOR VEHICLE

(75) Inventors: Joseph L Salani, Oxford, MI (US); Theodore R Hamilton, Durand, MI (US); Louis A Rhodes, Farmington Hills, MI (US); Glenn W Abbott, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/001,405

(22) Filed: Oct. 22, 2001

(51) Int. Cl.[7] .................................................. B60N 3/12
(52) U.S. Cl. ............................. 296/37.16; 296/37.15; 296/37.14; 296/37.1; 224/539; 224/404; 224/542
(58) Field of Search ............................. 296/37.16, 37.6, 296/37.5, 37.8, 37.14, 37.15, 37.1, 37.13; 224/404, 539, 542, 540, 328, 324; D12/422

(56) References Cited

U.S. PATENT DOCUMENTS

| | | | | |
|---|---|---|---|---|
| 2,578,238 A | * | 12/1951 | Goldman | 224/539 |
| 3,951,486 A | * | 4/1976 | Tracy | 224/540 |
| 4,406,387 A | * | 9/1983 | Rasor | 224/328 |
| 4,615,464 A | * | 10/1986 | Byrns | 220/324 |
| 5,039,155 A | * | 8/1991 | Suman et al. | 296/37.15 |
| 5,372,289 A | | 12/1994 | Dachicourt | 224/311 |
| 5,469,999 A | * | 11/1995 | Phirippidis | 224/542 |
| 5,501,384 A | * | 3/1996 | Wisniewski | 224/539 |
| 5,626,380 A | | 5/1997 | Elson et al. | 296/39.1 |
| 5,636,890 A | | 6/1997 | Cooper | 296/37.1 |
| 5,657,916 A | * | 8/1997 | Tackett | 224/404 |
| D383,112 S | * | 9/1997 | Patterson | D12/422 |
| 5,667,116 A | | 9/1997 | Reinhart et al. | 224/319 |
| 5,855,310 A | * | 1/1999 | Van Ert et al. | 296/37.16 |
| 5,979,725 A | * | 11/1999 | Lehrman | 224/539 |
| 5,979,962 A | * | 11/1999 | Valentin et al. | 296/37.1 |
| 6,041,987 A | * | 3/2000 | Tickoo | 224/542 |
| 6,129,401 A | | 10/2000 | Neag et al. | 296/37.6 |
| 6,149,040 A | * | 11/2000 | Walker | 296/37.1 |
| 6,241,137 B1 | * | 6/2001 | Corr | 224/404 |
| 6,253,943 B1 | * | 7/2001 | Spykerman et al. | 224/539 |
| 6,290,277 B1 | * | 9/2001 | Spykerman et al. | 296/37.16 |
| 6,308,873 B1 | * | 10/2001 | Baldas et al. | 224/404 |
| 6,338,518 B1 | * | 1/2002 | D'Annunzio et al. | 296/37.16 |
| 6,375,055 B1 | * | 4/2002 | Spykerman et al. | 224/542 |
| 6,386,612 B2 | * | 5/2002 | Hofmann et al. | 296/37.15 |
| 2001/0020631 A1 | * | 9/2001 | Spykerman et al. | 224/539 |
| 2001/0022451 A1 | * | 9/2001 | Ando et al. | 296/37.16 |
| 2002/0014505 A1 | * | 2/2002 | Lance et al. | 224/404 |
| 2002/0014777 A1 | * | 2/2002 | Gehring et al. | 296/37.5 |
| 2002/0070574 A1 | * | 6/2002 | Carlsson et al. | 296/37.14 |

\* cited by examiner

Primary Examiner—Kiran Patel
(74) Attorney, Agent, or Firm—Edwin W. Bacon, Jr.

(57) ABSTRACT

A removable storage unit for a motor vehicle including a first portion having an open side and defining a storage area, and a second portion having an open side and defining a second storage area. The first and second portions are rotateably coupled together to allow the storage areas to be adjacently located. The removable storage unit preferably has two modes. In the first mode, the storage unit is removed from the motor vehicle, and the open sides of the first and second portions are positioned adjacent one another, which allows for easy transportation of the unit. In the second mode, the storage unit is positioned within the motor vehicle so that the open sides of the first and second portions are oriented substantially coplanar.

13 Claims, 4 Drawing Sheets

REMOVABLE STORAGE UNIT FOR A MOTOR VEHICLE

FIELD OF THE INVENTION

The present invention generally pertains to motor vehicles. More particularly, the present invention pertains to a storage unit for a motor vehicle that may be removed and used exclusive of the vehicle.

BACKGROUND OF THE INVENTION

In motor vehicles, it is desirable to include various areas for the temporary storage of items. Motor vehicle manufacturers offer many different types of devices in which to store items. A first known type of storage device is permanently installed in the vehicle and provides storage for items while the items are in the vehicle. An example of this first type of storage device is a console located between the front seats of a vehicle. A second known type of storage device exists that may be removed from the vehicle and is commonly attached to the exterior of the vehicle on either the roof or to a trailer hitch. One example of the second type of storage device is a roof mounted carrier.

Both of these known styles of storage devices have proven to be satisfactory for their intended purposes of storing goods in the vehicle. However, these devices are not particularly well suited to moving goods away from the vehicle. The first type may not be removed from the vehicle at all and the second is generally large or cumbersome. Thus, goods must generally be individually removed from them in order to remove the goods from the vehicle. It is, therefore, desirable to provide a storage unit in which goods may be stored while in the vehicle and in which the goods may remain when moved from the vehicle. In order to address situations where this is desirable, various designs have been proposed.

For example, U.S. Patent No. 5,636,890 discloses a vehicular storage compartment that mounts in the opening of a vehicle floor. The storage compartment is generally tub-shaped and has a closure panel across the top. When mounted in a recess within a vehicle floor, the closure panel acts as a load floor in concert with the vehicle floor. The tub-shaped compartment is removable and may store items exclusive of a vehicle; however, it's use is limited to that of conventional storage tubs, which are bulky and awkward to use for portable storage.

U.S. Pat. No. 5,372,289 discloses a luggage rack adapted to attach to the inside ceiling of vehicle trunk. The luggage rack retains a storage module also referred to as a piece of luggage. The storage module is generally rectangular and may store items either within the vehicle or exclusive of the vehicle. The storage module's use, however, is also limited to that of conventional storage tubs, which are awkward to use for portable storage exclusive of the vehicle. Additionally, the storage module is retained in the trunk of a vehicle, which makes items stored therein less accessible to an occupant than items stored in a storage unit within the cab of a vehicle. In order to generally provide easy removal and portable transport of vehicular storage units and items stored therein, and to improve access to items stored within a vehicular storage unit by vehicle occupants, various removable vehicular storage units have been developed.

In order to generally provide easy removal and portable transport of vehicular storage units and items stored therein, and to improve access to items stored within a vehicular storage unit by vehicle occupants, various removable vehicular storage units have been developed.

SUMMARY OF THE INVENTION

It is a general object of the present invention to provide a storage unit for use in a vehicle that can also be used as a storage unit after being removed from the vehicle.

It is another object of the present invention to provide a removable vehicular storage unit that is accessibly retained within the cab portion of vehicle, which can act as a vehicle load floor when retained within a floor recess of motor vehicle, and which can be removed and used as a portable storage unit exclusive of the vehicle.

It is a further object of the present invention to provide a piece of luggage that can also act as a portable vehicular storage unit when integrally stowed within a motor vehicle.

It is yet another object of the present invention to provide a wheeled piece of luggage with a retractable handle that can also act as a vehicular storage unit when retained within a recess of a motor vehicle.

In one form, the present invention provides a removable storage unit for a motor vehicle including a first portion and a second portion rotatably coupled together. The first portion defines a first storage area having an open side, and the second portion defines a second storage area also having an open side. Preferably, the first portion and the second portion each include a respective first closure panel and second closure panel, which are adapted to cover the storage area of the respective first and second portion. Each of the closure panels is interconnected to their respective portion for articulation about a respective second and third axis. Preferably, the closure panels are interconnected to the respective portions through a respective second and third hinge along the second or third axis.

The removable storage unit has two modes of operation. In a first mode of operation, wherein the storage unit is removed from the motor vehicle, the open sides of the first and second portions are positioned adjacent one another. The portions are preferably retained in this configuration by at least one latch. The storage unit preferably includes a pair of carrier handles to facilitate carrying of the unit in this mode, and a pair of wheels to facilitate lateral transport in this mode.

In a second mode, the removable storage unit is positioned within the motor vehicle such that the open sides of the first and second portions are oriented substantially coplanar. In this mode, the first and second closure panels are either closed, in which case they provide a load floor within the vehicle, or are opened, in which case they each provide access to articles retained within their respective storage areas.

In another form of the present invention, in the first mode of operation, the storage unit forms a piece of luggage. The piece of luggage further includes a retractable handle preferably attached to the first portion, which is concealed in the first portion while in a recessed mode, and which projects from the body of the piece of luggage while in an extended mode. The wheels of the piece of luggage are preferably smaller than in the first mode in order to allow for optional rolling transport of the piece of luggage.

Additional benefits and advantages of the present invention will become apparent to those skilled in the art to which this invention relates from a reading of the subsequent description of the preferred embodiment and the appended claims, taken in conjunction with the accompany drawings.

DETAILED DESCRIPTION OF THE PREFERRED EMBODIMENTS

Figure 1:
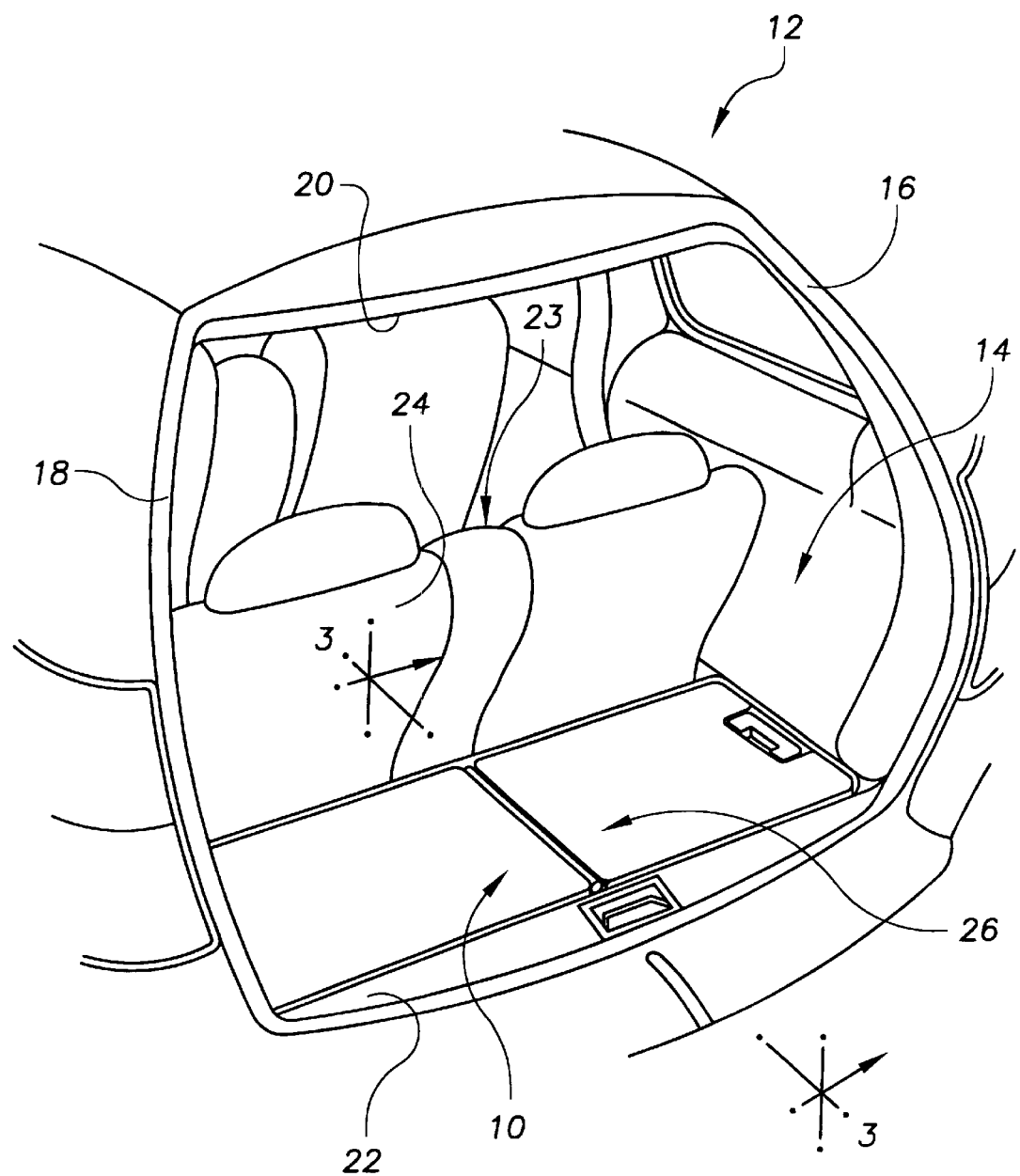
FIG. 1 is a perspective view of a storage unit constructed in accordance with the teachings of a first preferred embodiment of the present invention, the storage unit shown is operatively associated with a portion of a motor vehicle and illustrated with closure panels articulated to closed positions.

Referring to FIGS. 1 through 4, there is shown a removable storage unit 10 stowed within a large passenger vehicle 12. The vehicle 12 is a conventional large passenger type vehicle, such as a sport utility vehicle or a minivan, which typically has a large cargo storage area. The cargo area 14, wherein items may be stored, of vehicle 12 is generally defined by two walls 16, 18, a ceiling 20, and a floor 22. Further, the fore section of the cargo area is defined by the backs 24 of the last row of seats 23.

Figure 3:
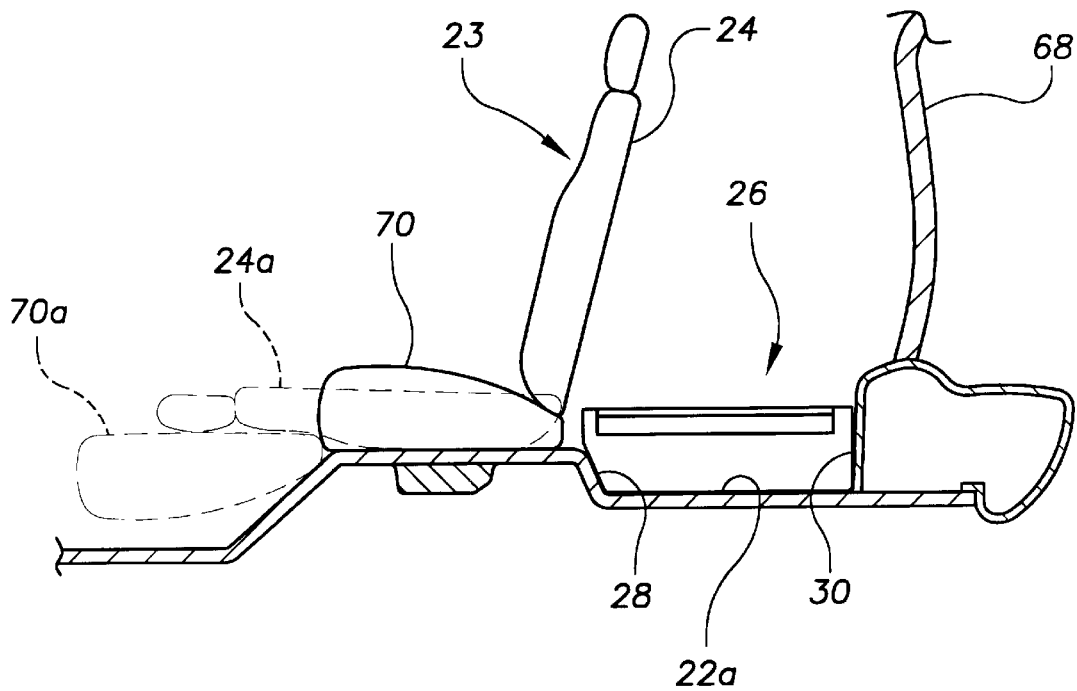
FIG. 3 is a simplified cross-sectional view taken along the line 3—3 of FIG. 1.

Within the cargo area 14, such large passenger vehicles may contain wells in which items may be placed. The removable storage unit 10 of the present invention is preferably stored within such a well 26. As shown in FIG. 3, the well 26 is defined on the bottom by a horizontal portion of the vehicle floor 22a, on the fore side by an angled wall segment 28, and on the rear side by the inside edge of the vehicle rear bumper assembly 30. The well 26 is preferably designed to specifically receive and hold snugly the removable storage unit 10.

Figure 4:
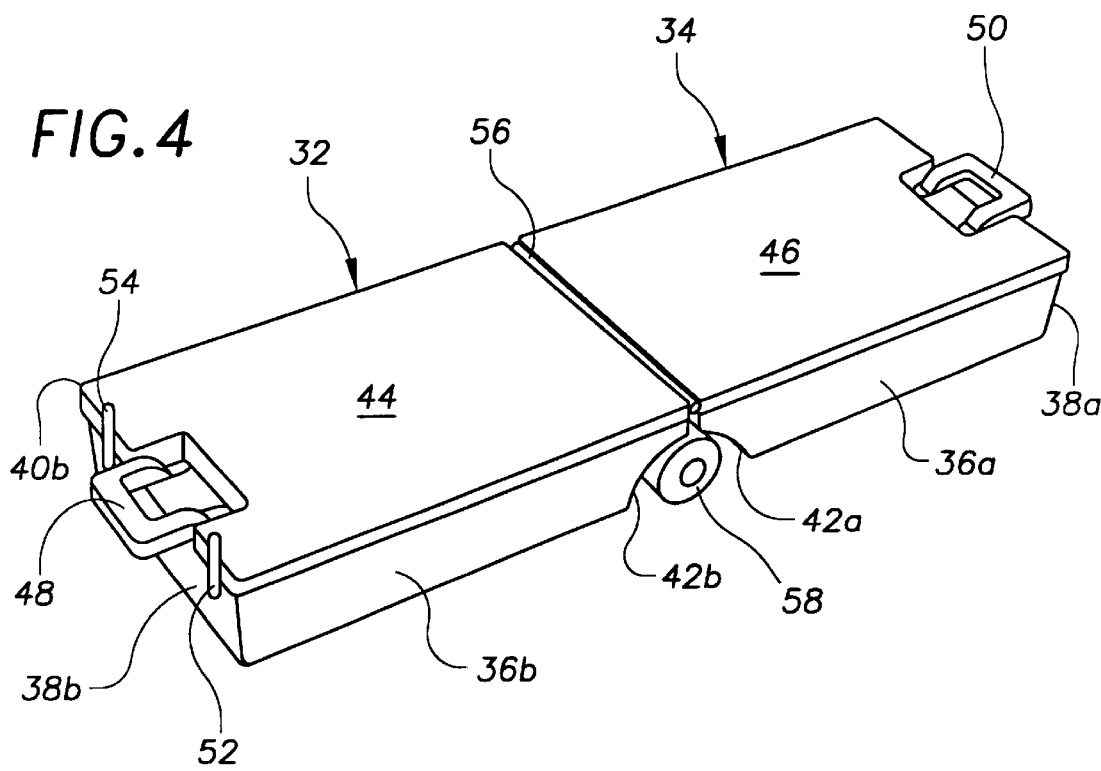
FIG. 4 is a perspective view of the storage unit of the first preferred embodiment of the present invention shown removed from the exemplary motor vehicle and in an unfolded mode.

As shown in FIG. 4, the removable storage unit 10 of the present invention generally includes two portions 32, 34 pivotally attached to each other. The portions, which are made from a rigid material such as metal or plastic, each generally form a tub-shaped container having an open side; each tub-shaped container portion generally defines an open space storage area 64, 66 (see FIG. 2). The two portions of the removable cargo unit 10 preferably include at least four generally vertical sides 36a, 36b; 38a, 38b; 40a, 40b; 42a, 42b for each of the two portions 32, 34; a respective closure panel 44, 46; and a respective carrier handle 48, 50. The first portion 32 preferably includes a pair of fasteners 52, 54 adapted to fasten on to the second portion 34.

In one use, the two portions 32, 34 may be rotated about the central axis 56, which is defined by a hinge 56 coexistent with the central axis, and locked together by fasteners 52, 54 to form a more easily movable storage unit. In this folded position, the removable storage unit 10 is folded in half about the axis 56, and the tops of the closure panels 44, 46 are facing each other. The latches 52, 54 retain the two portions in the folded position, and in this position, the wheels 58 allow for easy mobility of the removable storage unit 10 when removed from the vehicle 12. The carrier handles 48, 50 allow the unit to be easily pulled or carried. The wheels 58 are preferably of heavy-duty construction capable of supporting heavy loads, so that heavy equipment such as tools may be easily transported in the portable storage unit 10.

The corresponding closure panels 44, 46 may each be independently articulated about a corresponding closure panel axis 60, 62. Both of the closure panel axes 60, 62 in the preferred embodiment are perpendicular to the central axis 56, and are substantially in line with each other. However, this is only exemplary and it will be understood that the two sets of axes may also be placed parallel to the central axis 56 as well as to each other, or may even be co-located on the central axis 56. When the closure panels 44, 46 of the removable storage unit 10 are articulated into their closed position, they cover the open space storage areas 64, 66 of the corresponding portion 32, 34. The closure panels 44, 46 are preferably made of a rigid material, such as plastic or metal, and are preferably sufficiently rigid so as to maintain their shape upon the imposition of a load.

The removable storage unit generally has two modes of operation. As discussed above, in the first mode or folded position, the closure panels 44, 46 are oriented adjacent to and facing each other. In this mode of operation, the storage unit 10 is fairly compact and easy to transport. In the second mode or unfolded position, the portions 32, 34 are oriented 180 degrees from each other and are substantially coplanar. In this mode of operation, the storage unit 10 is preferably installed into the well 26 of the vehicle 12. In this position, the tops of the closure panels 44, 46 are generally co-planar with the main vehicle floor 22. Due to the creation of the well 26, the removable storage unit 10 is located below the main vehicle floor 22, and the top of the closure panels 44, 46 act as load floors within the vehicle. In this way, goods stored on top of the removable storage unit 10 may remain in generally the same plane throughout the entire cargo area 14. As discussed above, the portions 32, 34, as well as the closure panels 44, 46, are preferably made of a suitably stiff material so as to maintain their shape upon the imposition of a load.

Figure 2:
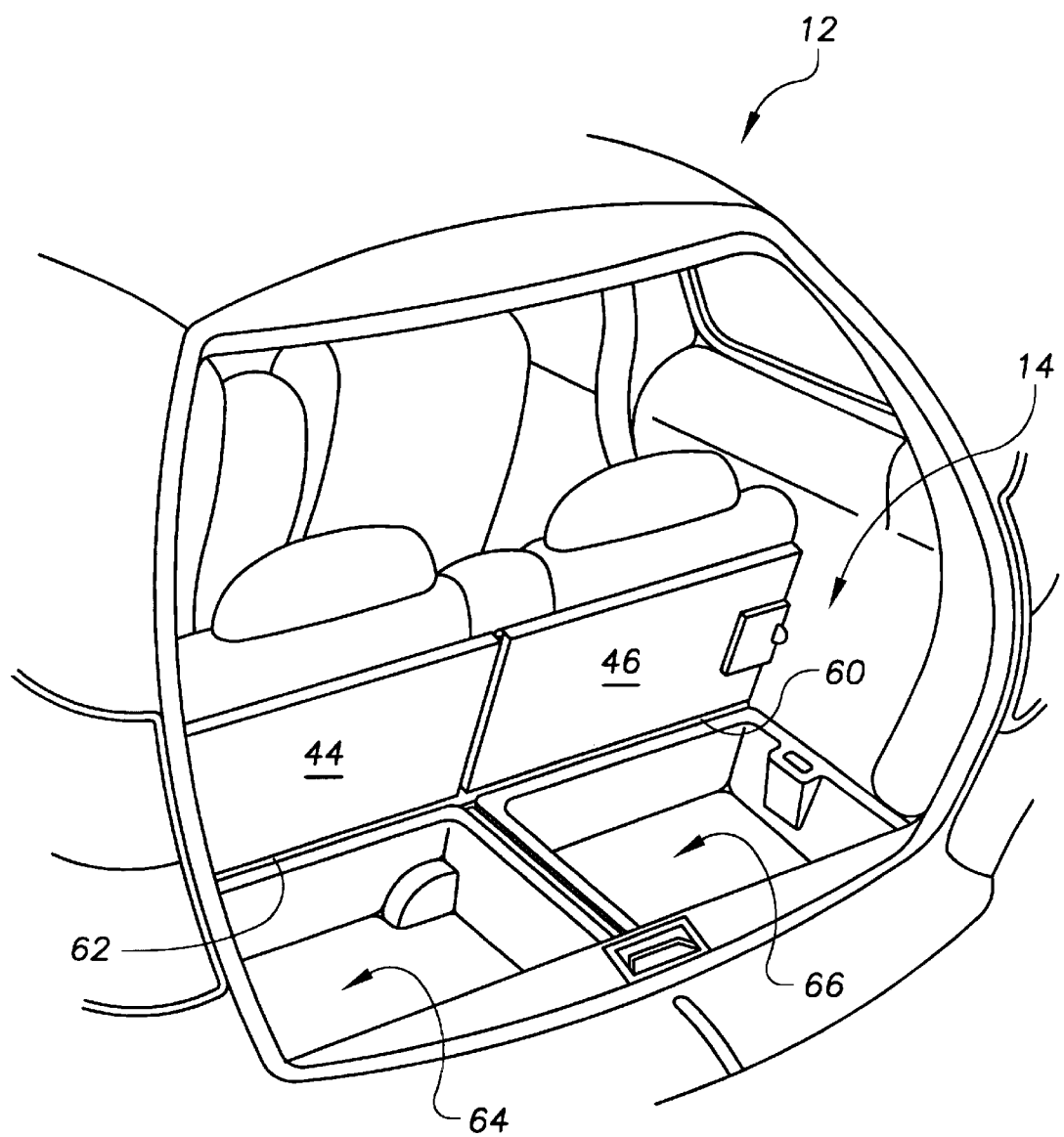
FIG. 2 is a perspective view similar to FIG. 1, illustrating the storage unit of the first preferred embodiment with the closure panels shown articulated to the opened position.

With particular reference to FIG. 2, the closure panels 44, 46 of the removable storage unit 10 are shown in the second mode articulated to their open positions. Each closure panel 44, 46 has been rotated about its respective axis 60, 62 to be in a generally perpendicular position compared to their closed positions. Here it is seen that each portion 32, 34 of the unit 10 defines a respective storage area 64, 66. In this way, items may be placed into either storage area 64 or 66 and, therefore, kept separate from other items as desired.

With the closure panels 44, 46 articulated to their closed positions, the ability of the storage unit 10 to support a load in the second mode of operation may be significant when large items are transported within the vehicle. For example, with particular reference to FIG. 3, the row of seats 23 may be folded down in a known manner to provide a larger cargo area 14. Therefore, even though the cargo area 14 is limited by a rear door or gate 68, the row of folding seats 23 allows for the storage of larger items. The back 24 of the row of seats 23 may move from their generally upward positions, shown in solid panel lines, to a second position 24a, shown in dotted lines, again in a known manner. A bottom seat portion 70 of the row of seats 23 may move from its first position, as shown in solid panel lines, to a second position 70a shown in broken lines. Thus, a flat plane is produced along the back 24a of the seat 23 when it is laying down, and the top of the closure panels 44, 46. Therefore, long or large items may be placed into the cargo area 14 of the vehicle 12 without including any sharp differences in height, thereby reducing the possibility of harming the cargo.

Figure 5:
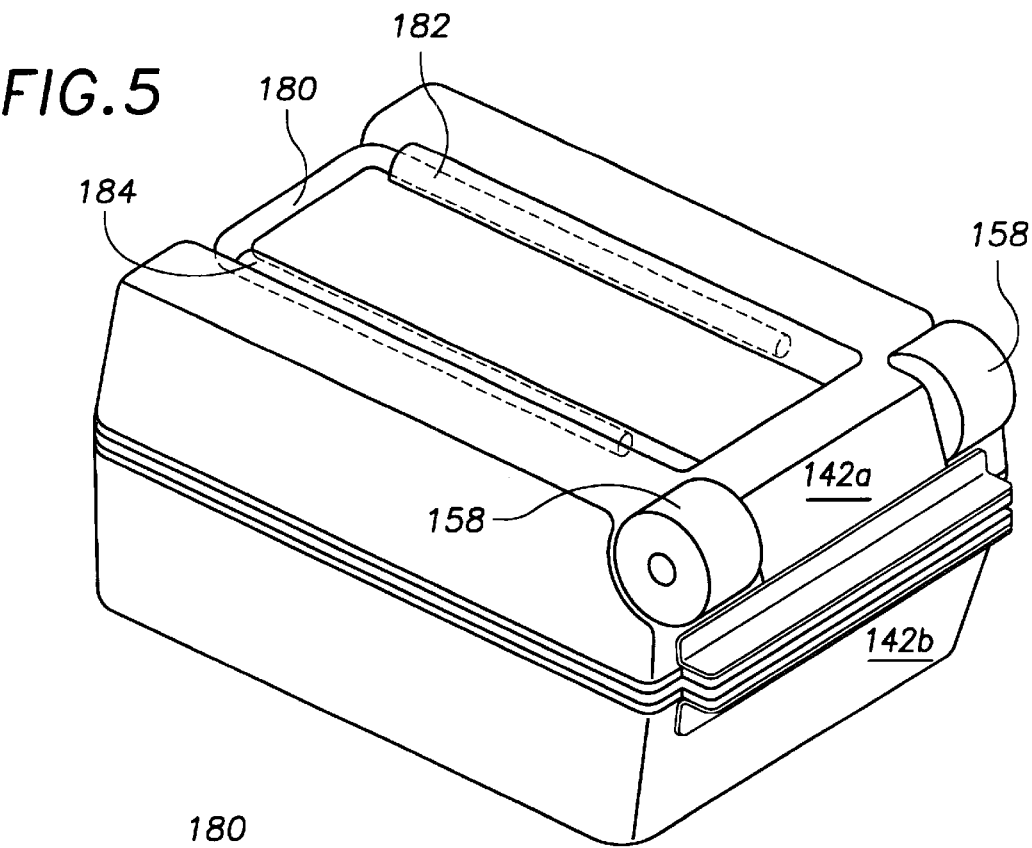
FIG. 5 is a perspective view of the storage unit of the second preferred embodiment of the present invention shown removed from the exemplary motor vehicle and in a folded state.
Figure 6:
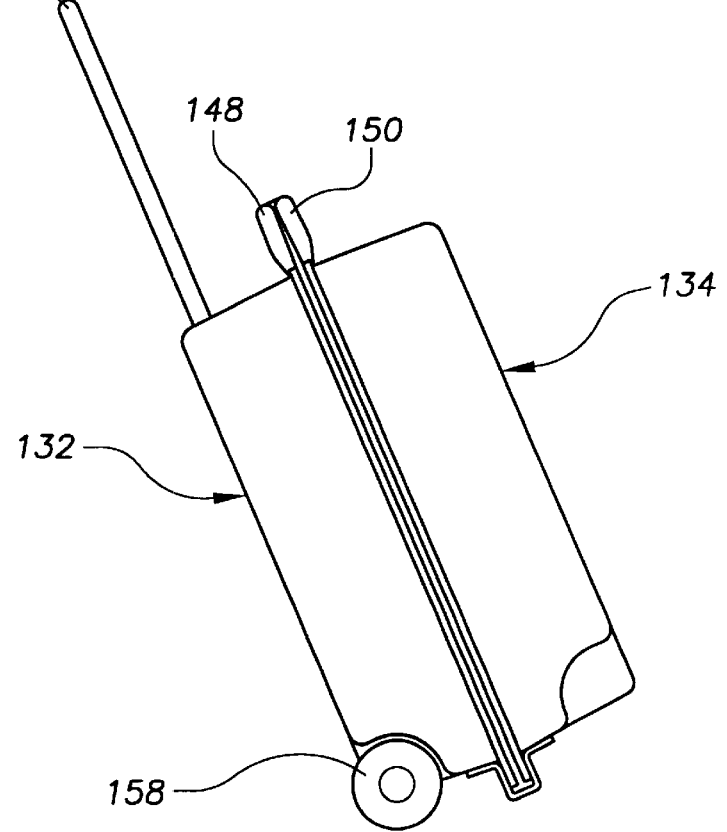
FIG. 6 is a perspective view of the second preferred embodiment of the present invention shown as a piece of luggage in a folded state with a retractable handle oriented in an extended position.

With particular reference to FIGS. 5 and 6, there is shown a removable storage unit 110 according to the second preferred embodiment of the present invention. The second preferred embodiment differs from the first preferred embodiment in that it further includes a retractable handle 180 and wheels 158 that are mounted differently. Except for preferences and aspects related to the retractable handle and the wheels, all other preferences and aspects are the same as the first preferred embodiment.

The storage unit 110 is shown in the folded position and removed from the vehicle 12. The storage unit 110 according to this embodiment is designed for use as a piece of luggage. As illustrated, the bottom is exposed showing the lower vertical walls 142a, 142b respectively of portions 132, 134. Affixed to one of the two bottom portions 142a or 142b are the wheels 158. These wheels allow for easy transport of the removable storage unit 110 once removed from the vehicle 12. The wheels 158 are preferably relatively sized so that the storage unit 110 may easily fit within the luggage compartment of an airplane or other such vehicle, but yet allow for easy lateral mobility of the storage unit when desired.

To enhance such mobility, a retractable handle 180 is affixed to one side of the removable storage unit 110. The carrier handles 148, 150 may optionally be included as well to allow the unit to be easily carried. In its retracted position, the retractable handle 180 remains within sleeves 182, 184 formed in one side of the removable storage unit 110. In its deployed position, the retractable handle 180 extends above the top of the removable storage unit 110 for easy grasping by an individual standing upright. Therefore, the removable storage unit 110 may be tilted while grasping the retractable handle 180 and rolled upon the wheels 158. Thus, the removable storage unit 110 originally resting within the cargo area 14 of the vehicle 12 may be removed from the vehicle, have its retractable handle 180 extended, and be rolledly transported on its wheels 158. The extension of the retractable handle 180 in this case using sleeves 182, 184 is only exemplary and it is not meant to preclude other means of allowing a handle to move from a retracted to an extended position.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A motor vehicle comprising:

a body defining a storage area;

a removable storage unit adapted to fit within the storage area, the storage unit comprising:

a first portion defining a first storage area having an open side; and a second portion defining a second storage area having an open side, the second portion coupled to the first portion for relative movement about a first axis;

wherein the removable storage unit is operative in a first mode when removed from the motor vehicle in which the open sides of the first and second portions are positioned adjacent one another, and a second mode when positioned within the storage area of the motor vehicle in which the open sides of the first and second portions are oriented substantially within a common plane.

2. The motor vehicle of claim 1, wherein the storage area includes at least one recess formed in the floor of the motor vehicle.

3. The motor vehicle of claim 2, wherein the motor vehicle includes a vehicle having a rear access door, and wherein the at least one floor recess is adjacent to the rear access door.

4. The motor vehicle of claim 2, wherein the at least one floor recess includes a pair of adjacent foot rest recesses.

5. The motor vehicle of claim 1, said storage unit further comprising a first closure panel interconnected to the first portion for articulation about a second axis.

6. The motor vehicle of claim 5, said storage unit further comprising a second closure panel interconnected to the second portion for articulation about a third axis.

7. The motor vehicle of claim 6, wherein the second and third axes are perpendicular to the first axis.

8. The motor vehicle of claim 6, wherein the second and third axes are parallel to the first axis.

9. The motor vehicle of claim 6, Wherein the first closure panel and the second closure panel form a load floor in the first mode.

10. The motor vehicle of claim 1, said storage unit further comprising a plurality of wheels for rolledly transporting the removable storage unit in the first mode.

11. The motor vehicle of claim 1, said storage unit further comprising a first carrier handle attached to the first portion and a second carrier handle attached to the second portion.

12. The motor vehicle of claim 1, said storage unit further comprising a retractable handle attached to the first portion having a retracted position in which the retractable is concealed within the first portion and an extended position in which the handle portion projects from the storage unit.

13. The motor vehicle of claim 1, said storage unit further comprising at least one latch adapted to retain the removable storage unit in the first mode.

* * * * *